(12) United States Patent
Wang et al.

(10) Patent No.: US 8,602,367 B2
(45) Date of Patent: *Dec. 10, 2013

(54) SUPPORTING BRACKET FOR COMPUTER MONITOR DEVICE

(75) Inventors: Liang-Chin Wang, New Taipei (TW); Yun-Lung Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/427,827

(22) Filed: Mar. 22, 2012

(65) Prior Publication Data

US 2013/0026312 A1   Jan. 31, 2013

(30) Foreign Application Priority Data

Jul. 27, 2011   (CN) .......................... 2011 1 0211791

(51) Int. Cl.
| | | |
|---|---|---|
| *A47F 5/00* | (2006.01) | |
| *A47F 7/00* | (2006.01) | |
| *F16M 11/00* | (2006.01) | |
| *F16M 13/00* | (2006.01) | |
| *F16L 3/00* | (2006.01) | |
| *F16L 3/08* | (2006.01) | |
| *E04G 3/00* | (2006.01) | |
| *A47B 43/00* | (2006.01) | |
| *A47B 47/00* | (2006.01) | |
| *A47B 57/00* | (2006.01) | |
| *B25G 3/36* | (2006.01) | |

(52) U.S. Cl.
USPC ..................... 248/125.7; 248/125.1; 248/121; 248/74.2; 248/282.1; 248/917; 211/206; 211/207; 403/384

(58) Field of Classification Search
USPC ........ 248/917–922, 121, 122.1, 125.1, 125.7, 248/534, 539, 221.11, 220.21, 218.4, 230.1, 248/230.5; 285/18; 403/384, 386, 398
See application file for complete search history.

(56) References Cited

U.S. PATENT DOCUMENTS

| | | | | |
|---|---|---|---|---|
| 2,455,525 | A * | 12/1948 | Schulz | ........................ 248/188.5 |
| 3,306,639 | A * | 2/1967 | Lyon | .............................. 403/107 |
| 4,687,167 | A * | 8/1987 | Skalka et al. | ................. 248/126 |
| 5,011,104 | A * | 4/1991 | Fang | ........................... 248/125.8 |
| 5,433,551 | A * | 7/1995 | Gordon | ......................... 403/377 |
| 5,492,430 | A * | 2/1996 | Jones | ......................... 403/109.5 |
| 5,499,430 | A * | 3/1996 | Strazar | ............................ 24/279 |
| 6,761,274 | B1 * | 7/2004 | Chen | .............................. 211/207 |
| 6,779,767 | B2 * | 8/2004 | Kuhn | .......................... 248/276.1 |
| 7,077,277 | B2 * | 7/2006 | Wang | .......................... 211/206 |
| 7,264,212 | B2 * | 9/2007 | Hung | .......................... 248/282.1 |
| 7,290,742 | B2 * | 11/2007 | Wang | .......................... 248/200.1 |
| 7,467,775 | B2 * | 12/2008 | Lu et al. | ......................... 248/663 |
| 7,806,378 | B2 * | 10/2010 | Oddsen, Jr. | .............. 248/280.11 |

(Continued)

*Primary Examiner* — Daniel J Troy
*Assistant Examiner* — Muhammad Ijaz
(74) *Attorney, Agent, or Firm* — Altis Law Group, Inc.

(57) ABSTRACT

A supporting bracket for a monitor device includes a stand and a controlling structure. The stand comprises a shank. The controlling structure comprising an installation member, a blocking member, a clamping member, a resilient member and a controlling member. The installation member comprises an installation portion in which an installation hole is defined. The blocking member is engaged in the installation hole. The clamping member is installed on the blocking member and against the shank. The resilient member is sandwiched between the installation portion and the clamping member. The controlling member installed in the installation member. The controlling member is rotatable relative to the installation member to modulate a friction between the shank and the clamping member.

11 Claims, 4 Drawing Sheets

(56) References Cited

U.S. PATENT DOCUMENTS

| | | | |
|---|---|---|---|
| 8,152,124 B2* | 4/2012 | Branham | 248/475.1 |
| 8,162,268 B1* | 4/2012 | Huang | 248/124.1 |
| 8,197,154 B2* | 6/2012 | Broering et al. | 403/165 |
| 8,282,052 B2* | 10/2012 | Huang | 248/125.1 |
| 8,453,980 B2* | 6/2013 | Sapper et al. | 248/125.7 |
| 2002/0011544 A1* | 1/2002 | Bosson | 248/121 |
| 2002/0088907 A1* | 7/2002 | Phillips | 248/157 |
| 2006/0065795 A1* | 3/2006 | Blackburn | 248/122.1 |
| 2007/0145202 A1* | 6/2007 | Hsieh | 248/161 |
| 2007/0295878 A1* | 12/2007 | Smed | 248/413 |
| 2008/0011924 A1* | 1/2008 | Li | 248/309.1 |
| 2008/0068784 A1* | 3/2008 | Bouissiere | 361/681 |
| 2009/0078841 A1* | 3/2009 | Oddsen, Jr. | 248/279.1 |
| 2009/0146090 A1* | 6/2009 | Hashimoto et al. | 251/25 |
| 2009/0256047 A1* | 10/2009 | Zhao et al. | 248/408 |
| 2012/0098250 A1* | 4/2012 | Chang et al. | 285/18 |
| 2013/0021539 A1* | 1/2013 | Austin et al. | 348/836 |
| 2013/0026311 A1* | 1/2013 | Chen et al. | 248/125.7 |

* cited by examiner

SUPPORTING BRACKET FOR COMPUTER MONITOR DEVICE

BACKGROUND

1. Technical Field

The present disclosure relates to supporting brackets, and particularly to a supporting bracket for a computer monitor device.

2. Description of Related Art

In a computer system, a monitor device is configured to be secured to a supporting bracket. The monitor device can be conveniently adjusted up or down. However, users may need to adjust the monitor in a right direction or a left direction, the supporting bracket has to adjust synchronistically with the monitor device.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
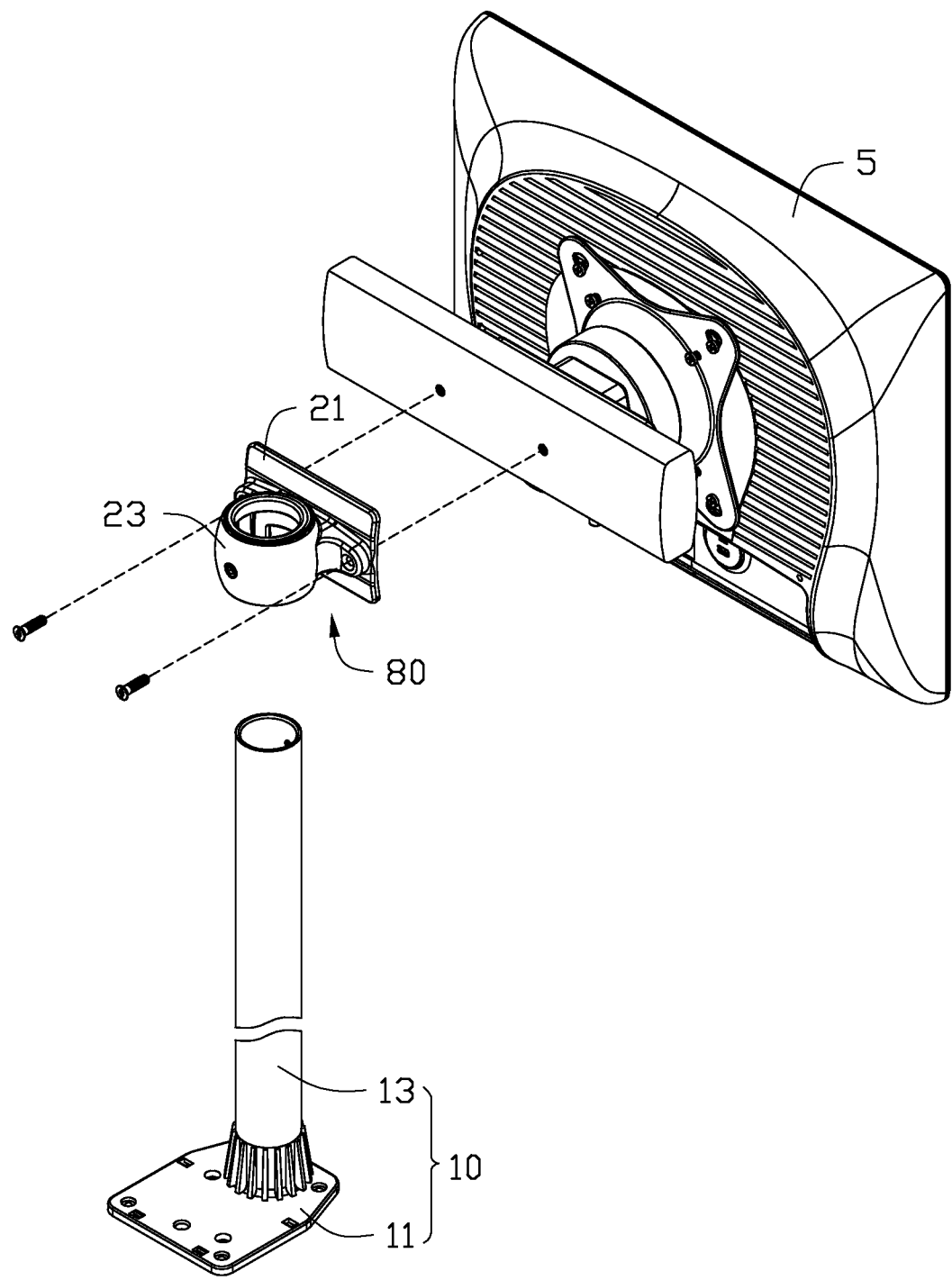
FIG. 1 is an exploded, isometric view of an embodiment of a supporting bracket and a monitor device.

Referring to FIG. 1, a supporting bracket in accordance with an embodiment is configured to support a monitor device 5. The supporting bracket comprises a stand 10 and a controlling structure 80.

The stand 10 comprises a body 11 and a shank 13 connected to the body 11. In one embodiment, the shank 13 is a hollow column.

Figure 2:
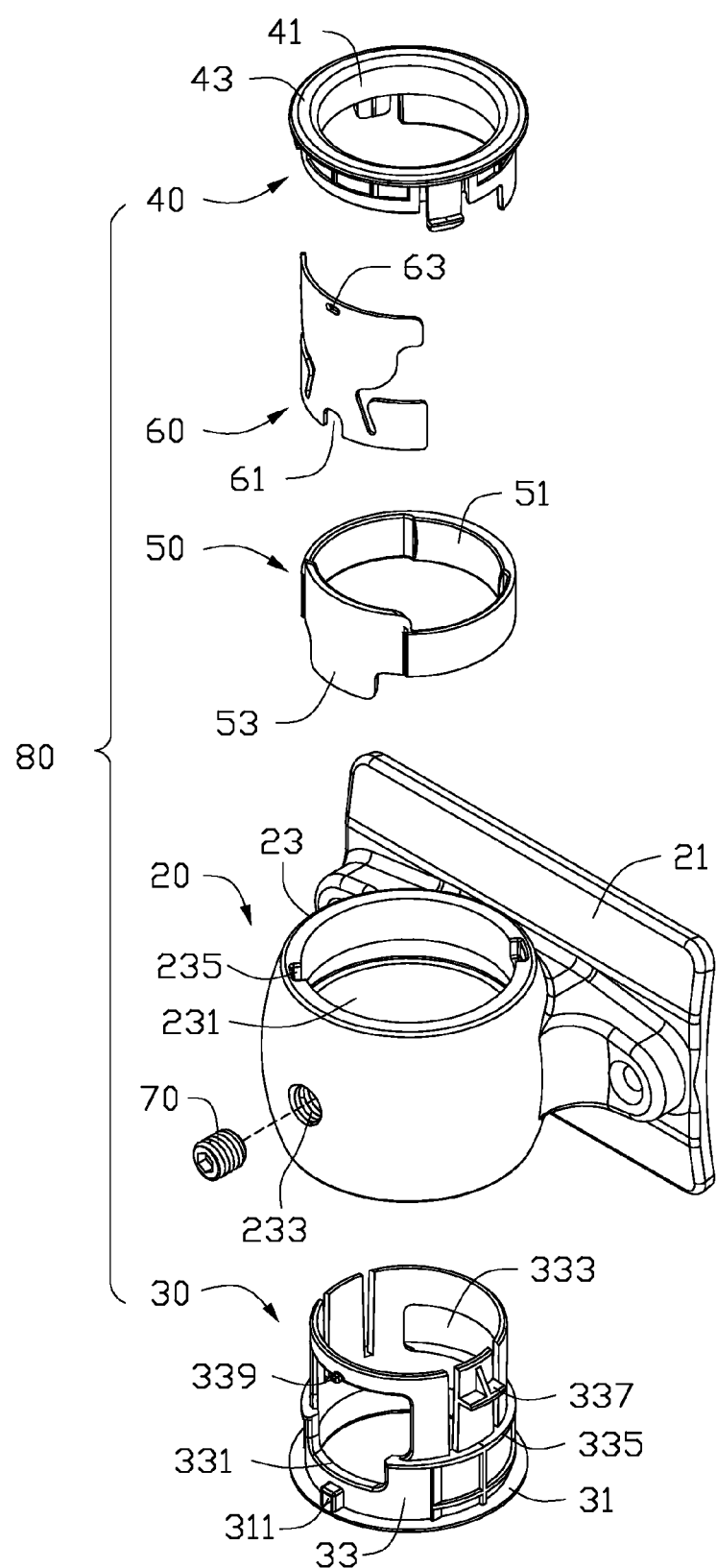
FIG. 2 is an exploded, isometric view of a controlling structure of FIG. 1.

Referring to FIG. 2, the controlling structure 80 comprises an installation member 20, a blocking member 30, an engaging member 40, a clamping member 50, a resilient member 60, and a controlling member 70. In one embodiment, the controlling member 70 is a screw.

Figure 4:
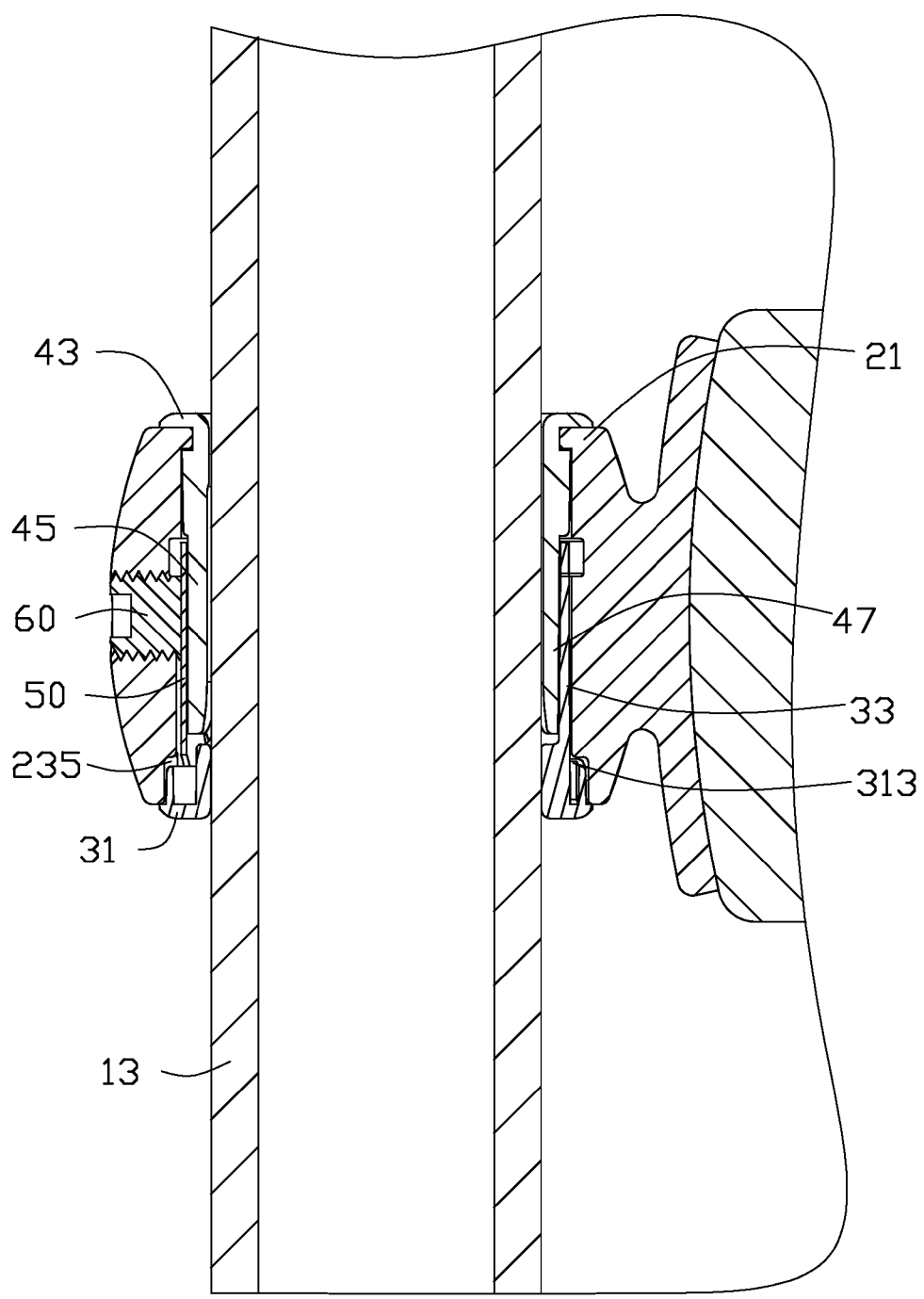
FIG. 4 is a cutaway, cross-sectional view of the supporting bracket and the monitor device of FIG. 3, taken along the line IV-IV.

The installation member 20 comprises a supporting board 21 and an installation portion 23 connected to the supporting board 21. The supporting board 21 is configured to secure the monitor device 5. An installation hole 231 is defined in the installation portion 23. The installation portion 23 defines a threaded hole 233 communicating with the installation hole 231. Two cutouts 235 (shown in FIG. 4) are defined in an opposite side of the installation portion 23 communicating with the installation hole 231. In one embodiment, a diameter of the installation hole 231 is greater than a diameter of the shank 13.

The blocking member 30 comprises a stopping portion 31 and a blocking portion 33 connected to the stopping portion 31. In one embodiment, the blocking portion 33 is a hollow column. A first protrusion 311 and a second protrusion 313 (shown in FIG. 4) are located on the stopping portion 31 and connected to the blocking portion 33. In one embodiment, the first protrusion 311 and the second protrusion 313 are mirror images of each other. The blocking portion 33 defines a first gap 331 in a first side thereof, and the blocking portion 33 defines a second gap 333 in a second side opposite to the first side. A circular flange 335 is located on a sidewall of the blocking portion 33. Two tabs 337 are located on the blocking portion 33. A pillar 339 is located on the blocking portion 33. In one embodiment, the first protrusion 311 and the pillar 339 are located on an opposite side of the first gap 331.

The engaging member 40 comprises a holding portion 41 and a latching portion 43 extending from the holding portion 41. In one embodiment, the holding portion 41 is a hollow column, and a diameter of the holding portion 41 is smaller than a diameter of the installation hole 231.

The clamping member 50 includes a retaining portion 51 and a resisting piece 53 connected to the retaining portion 51. In one embodiment, the retaining portion 51 is ring-shaped.

The resilient member 60 defines a nick 61 and a through hole 63. In one embodiment, the resilient member 60 is substantially semi-cylindrical.

Figure 3:
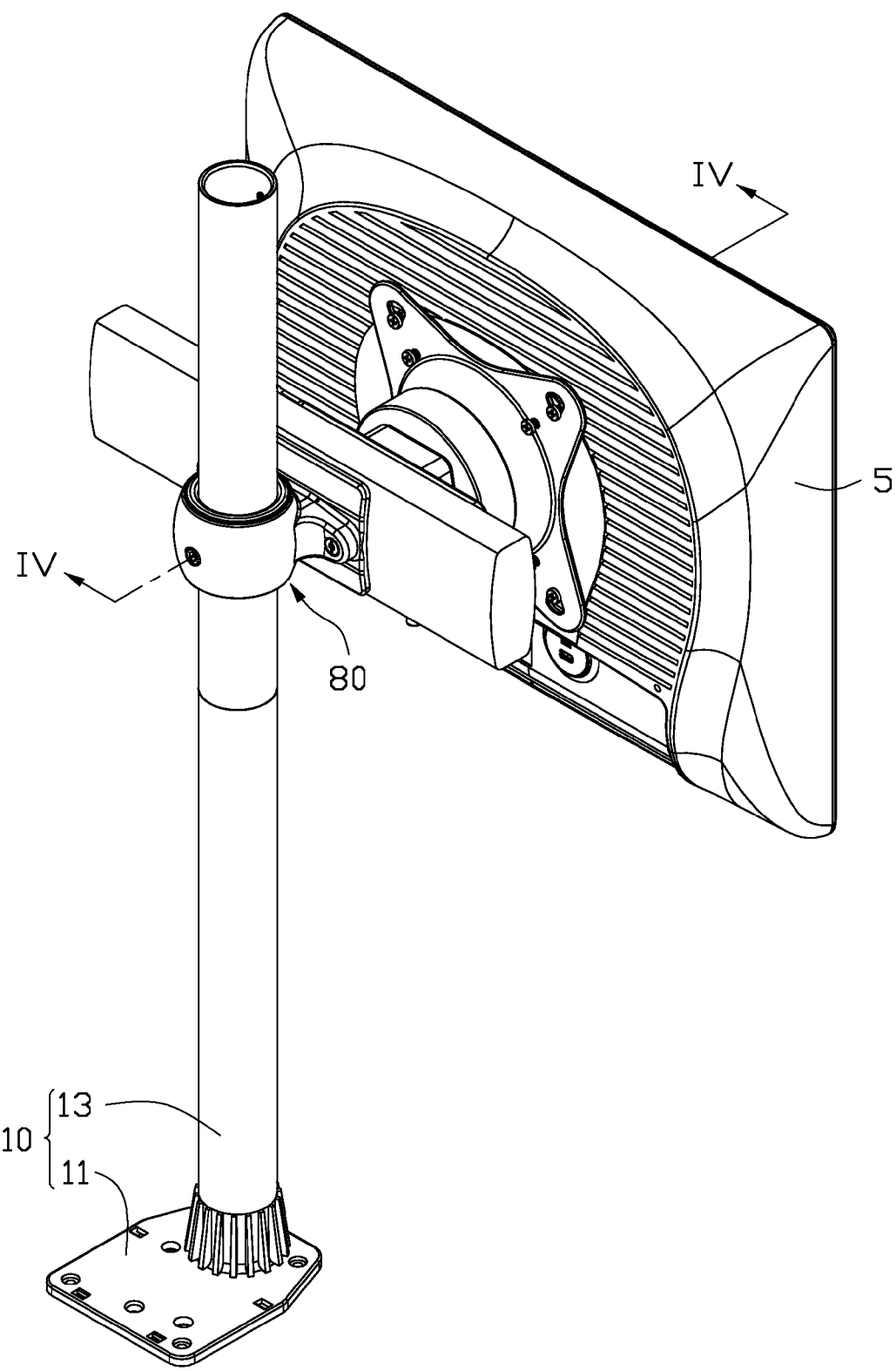
FIG. 3 is an assembled view of the supporting bracket and the monitor device of FIG. 1.

Referring to FIG. 3, in assembly, the retaining portion 51 is installed on the blocking portion 33 and sandwiched between the two tabs 337 and the flange 335. The resisting piece 53 is received in the first gap 331. A holding piece 45 is engaged with the blocking portion 33. The resilient member 60 is placed in the stopping portion 31 and abuts the blocking portion 33. The first protrusion 311 is engaged in the nick 61. The pillar 339 is engaged in the through hole 63 to install the resilient member 60 to the blocking member 30. The holding portion 41 is engaged with the blocking portion 33. The engaging member 40 extends through the installation hole 231, until the latching portion 43 abuts a first end of the installation portion 23, and the stopping portion 31 abuts a second end opposite to the first end of the installation portion 23. The first protrusion 311 and the second protrusion 313 are engaged in the two cutouts 235. The resilient member 60 is sandwiched between an inside wall of the installation portion 23 and the resisting piece 53. The controlling member 70 is installed in the threaded hole 233.

In assembly of the controlling structure 80 and the stand 10, the shank 13 extends through the installation hole 231. The holding portion 41 and the blocking portion 33 abut the shank 13. The controlling structure 80 is capable of being slid along the shank 13 and configured to be rotated around the shank 13. The controlling member 70 is rotated to move towards the resilient member 50, until the controlling member 70 biases the resilient member 60 to be elastically deformed to press the holding piece 45. The clamping member 50 is tightened to increase friction between the clamping member 50 and the shank 13, for preventing the controlling structure 80 from moving relative to the shank 13. The monitor device 5 is thereby installed on the stand 10.

The controlling member 70 is rotated to move away from the resilient member 60. The resilient member 60 elastically returns to reduce the friction between the engaging member 40 and the shank 13. The controlling structure 80 can be slid or rotated relative to the shank 13.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A supporting bracket comprising:
a stand, the stand comprising a shank;
a controlling structure, the controlling structure comprising an installation member, a blocking member, a clamping member, a resilient member, and a controlling member, the installation member comprising an installation portion, the installation portion defining an installation hole, the blocking member engaged in the installation hole, the clamping member surrounding the blocking member and abutting the shank, the resilient member engaged with the blocking member and positioned between an inner wall of the installation member and the clamping member, the controlling member installed in the installation member, the resilient member being resiliently deformable to abut the clamping member driven by the controlling member, and a friction force between the shank and the clamping member being adjustable by rotating the controlling member relative to the installation member;
the blocking member comprises a blocking portion, the clamping member comprises a retaining portion and a resisting piece connected to the retaining portion, the blocking portion defines a first gap and a second gap, the resisting piece is received in the first gap and abuts the shank, and the retaining portion is partially received in the second gap and abuts the shank through the second gap;
a flange and two tabs are located on the blocking member, the retaining portion is engaged between the flange and the two tabs;
the engaging member further comprises a latching portion extending from the holding portion, the blocking member further comprises a stopping portion connected to the blocking portion, the latching portion abuts a first end of the installation portion, and the stopping portion abuts a second end opposite to the first end of the installation portion;
a first protrusion and a second protrusion being located on the stopping portion, wherein two cutouts are defined in the installation portion, and each of the first protrusion and the second protrusion is engaged in each of the two cutouts; and
the resilient member defines a nick and a through hole, a pillar is protruded from the blocking portion, the first protrusion is engaged in the nick, and the pillar is engaged in the through hole to engage the resilient member with the blocking member and abut the resisting piece.

2. The supporting bracket of claim 1, wherein the controlling structure further comprises an engaging member, the engaging member comprises a holding portion, and the holding portion is engaged with the blocking portion.

3. The supporting bracket of claim 2, wherein a diameter of the blocking portion is greater than a diameter of the shank, and a diameter of the holding portion is greater than the diameter of the shank.

4. The supporting bracket of claim 1, wherein the installation portion defines a threaded hole communicating with the installation hole, and the controlling member is rotatably engaged in the threaded hole to abut the resilient member or disengage from the resilient member.

5. The supporting bracket of claim 1, wherein the installation member further comprises a supporting board connected to the installation portion, and the supporting board is configured to secure a monitor device.

6. A supporting bracket comprising:
a stand, the stand comprising a shank;
a controlling structure configured to be installed on the shank, the controlling structure comprising an installation member, a blocking member, an engaging member, a clamping member, a resilient member, and a controlling member; the installation member is configured to support a monitor device and comprises an installation portion defining an installation hole, the blocking member installed in the installation hole and engaged with the engaging member, the clamping member surrounding the blocking member and abutting the shank, the resilient member engaged with the blocking member and positioned between an inner wall of the installation portion and the clamping member, the controlling member installed in the installation member; the resilient member being resiliently deformable to abut the clamping member driven by the controlling member, and the controlling member being rotatable relative to the installation member to adjust a friction force between the shank and the clamping member;
the blocking member comprises a blocking portion, the engaging member comprises a holding portion, the blocking portion is engaged with an inside wall of the holding portion;
the engaging member further comprises a latching portion extending from the holding portion, the blocking member further comprises a stopping portion connected to the blocking portion, the latching portion is engaged with a first end of the installation portion, and the stopping portion is engaged with a second end opposite to the first end of the installation portion;
a first protrusion and a second protrusion located on the stopping portion, wherein two cutouts are defined in the installation portion, and each of the first protrusion and the second protrusion is engaged in each of the two cutouts; and
the resilient member defines a nick and a through hole, a pillar is protruded from the blocking portion, the first protrusion is engaged in the nick, and the pillar is engaged in the through hole to engage the resilient member with the blocking portion and abuts the clamping member.

7. The supporting bracket of claim 6, wherein a diameter of the blocking portion is smaller than a diameter of the installation hole, and a diameter of the holding portion is smaller than the diameter of the installation hole.

8. The supporting bracket of claim 6, wherein the clamping member comprises a retaining portion and a resisting piece connected to the retaining portion, the blocking portion defines a first gap and a second gap, the resisting piece is received in the first gap and abuts the shake shank, and the retaining portion is partially received in the second gap and abuts the shank through the second gap.

9. The supporting bracket of claim 8, wherein a flange and two tabs are located on the blocking member, the retaining portion is engaged between the flange and the two tabs.

10. The supporting bracket of claim 6, wherein an outside diameter of the stopping portion is greater than a diameter of the blocking portion.

11. The supporting bracket of claim 6, wherein the installation portion defines a threaded hole communicating with the installation hole, the controlling member is rotatably engaged in the threaded hole to abut the resilient member or disengage from the resilient member.

* * * * *